United States Patent [19]
Kawanami

[11] Patent Number: 5,933,661
[45] Date of Patent: Aug. 3, 1999

[54] OPTICAL APPARATUS HAVING THE IMAGE BLUR CORRECTING FUNCTION

[75] Inventor: Akihiro Kawanami, Tokyo, Japan

[73] Assignee: Canon Kabushiki Kaisha, Tokyo, Japan

[21] Appl. No.: 09/034,504

[22] Filed: Mar. 4, 1998

[30]     Foreign Application Priority Data

Mar. 7, 1997  [JP]  Japan ..................................... 9-053462

[51] Int. Cl.$^6$ ............................. G03B 13/36; G03B 17/00
[52] U.S. Cl. ............................................. 396/55; 396/135
[58] Field of Search ............................. 396/55, 133, 135, 396/136; 348/208; 359/554

[56]              References Cited

U.S. PATENT DOCUMENTS

| | | | |
|---|---|---|---|
| Re. 35,583 | 8/1997 | Hamada et al. ........................... | 396/55 |
| 5,761,547 | 6/1998 | Hirano et al. .............................. | 396/55 |
| 5,805,937 | 9/1998 | Kitagawa ................................... | 396/55 |

*Primary Examiner*—W. B. Perkey
*Attorney, Agent, or Firm*—Fitzpatrick, Cella, Harper & Scinto

[57]              ABSTRACT

An optical apparatus having the image blur correcting function has control means for effecting first drive control for moving optical means to correct image vibration and second drive control for moving the optical means for focus adjustment, and varying means for effecting 1) to make the manner of the first control differ between a case where the first control is effected in parallel with the second control and a case where the first control is effected without the second control being effected in parallel (to change (lengthen) the execution cycle of image blur correction control to thereby prevent an image blur correction control routine from being repetitively executed), or 2) to make the manner of the second control differ between a case where the second control is effected in parallel with the first control and a case where the second control is effected without the first control being effected in parallel (specifically, to change the control characteristics of driving velocity (the deceleration characteristic during the movement to a target position and the deceleration starting timing) in the driving control of a focusing lens to thereby reduce the frequency of the driving control of the focusing lens), whereby image blur correction control and focusing control are to be executed at a time, one of these two control methods can be changed into a method in which the burden of the control means becomes lighter, and the performance of the both kinds of control can be maintained high by the use of a relatively inexpensive control means.

12 Claims, 9 Drawing Sheets

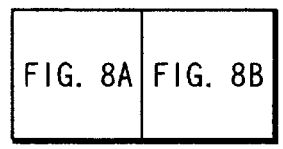
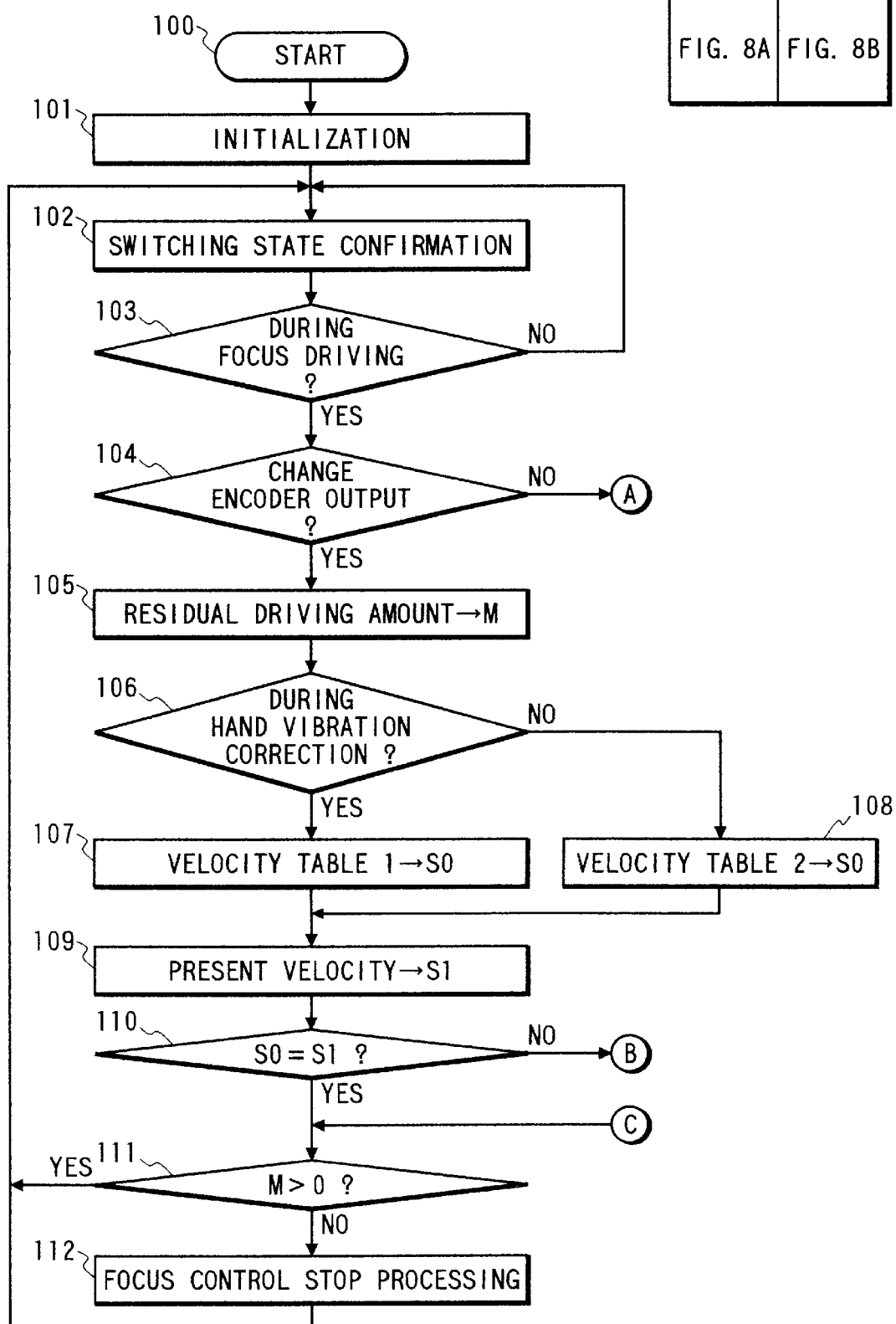

OPTICAL APPARATUS HAVING THE IMAGE BLUR CORRECTING FUNCTION

BACKGROUND OF THE INVENTION

1. Field of the Invention

This invention relates to an optical apparatus having the image blur correcting function of correcting image blur caused by hand vibration or the like in a camera, an optical instrument or the like.

2. Related Background Art

An auto focus lens in which so-called hand vibration correction (anti-vibration control) can be effected by the adoption of a vibration gyroscope has been developed, whereby the photographing frequency of hand vibration pictures due to the low shutter speed of a camera according to the prior art has been alleviated and anybody has become able to take fine photographs simply. Such anti-vibration control, like the focusing lens drive control in a camera, is controlled by a microcomputer carried on a lens device or a camera.

However, by the anti-vibration function being added without the good auto focus performance in the prior art being reduced, the burden of the microcomputer is decreased, and this has led to the birth of the problem that it is unavoidable to adopt a countermeasure leading to the increased cost of the lens device or the like, such as using a plurality of microcomputers to effect parallel processing and reducing the burden of the individual microcomputers, or using a microcomputer of a high processing speed.

SUMMARY OF THE INVENTION

So, the present invention has as its object to provide a lens apparatus and an optical apparatus in which an increase in cost is suppressed and yet a plurality of kinds of control such as anti-vibration control and auto focus control can be effected with sufficient control performance.

One aspect of the invention is an optical apparatus having an image blur correcting function which comprises optical means for performing a focus adjustment, image blur correction means for correcting an image blur, control means for effecting first drive control for driving the image blur correction means to correct image vibration and second drive control for moving the optical means for focus adjustment, and varying means for effecting 1) to make the manner of said first control differ between a case where the first control is effected in parallel with said second control and a case where the first control is effected without the second control being effected in parallel, or 2) to make the manner of the second control differ between a case where the second control is effected in parallel with the first control and a case where the second control is effected without the first control being effected in parallel, whereby image blur correction control and focusing control are to be executed at a time, one of these control methods can be changed into a method in which the burden of the control means becomes lighter, and the performance of the both kinds of control can be maintained high by the use of a relatively inexpensive control means.

DESCRIPTION OF THE PREFERRED EMBODIMENTS

First Embodiment

Figure 1:
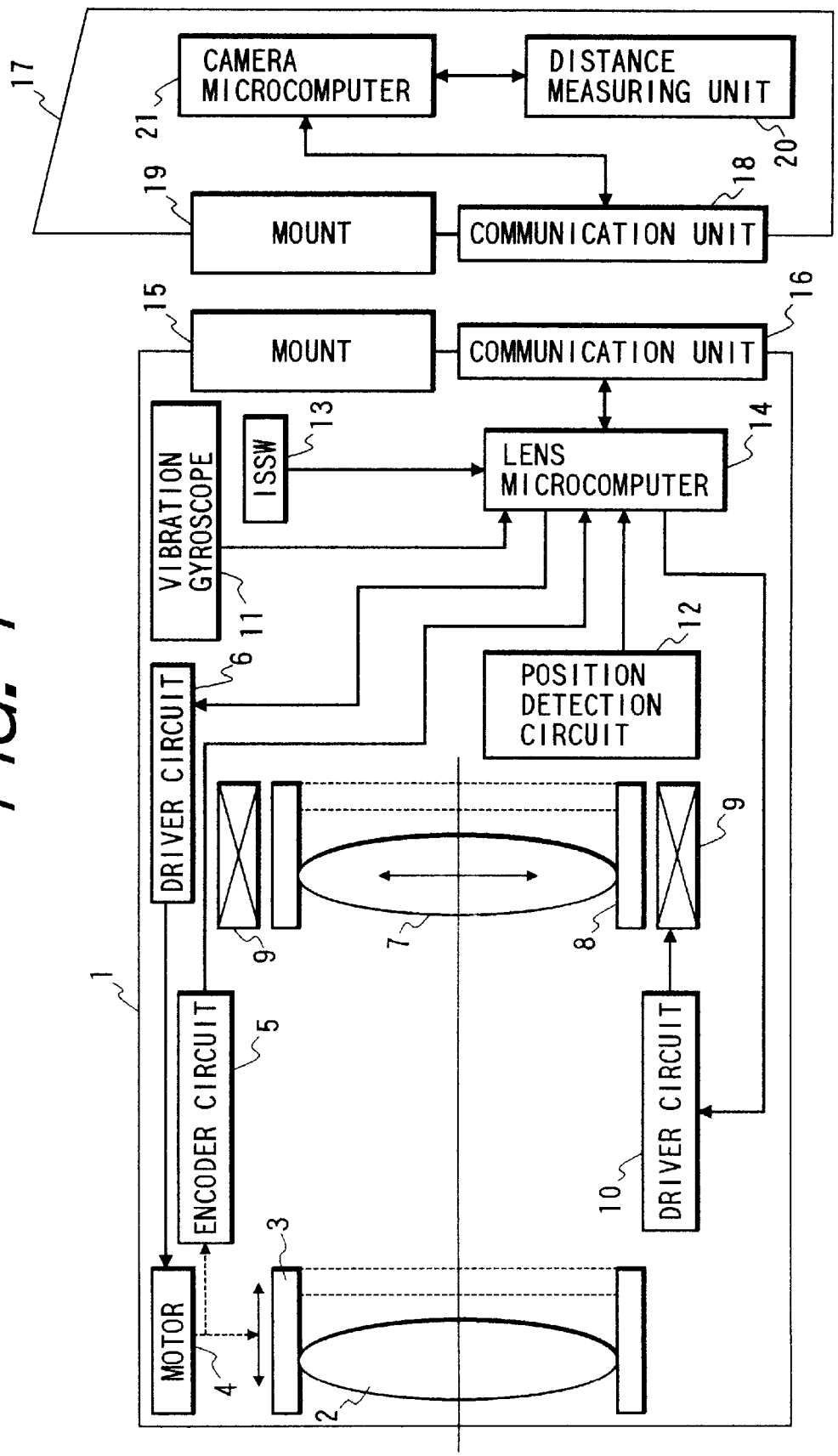
FIG. 1 is a block diagram showing the internal construction of a camera and a lens which is a first embodiment of the present invention.

FIG. 1 shows the construction of an auto focus lens apparatus with the hand vibration correcting (anti-vibration control) function. The reference numeral 1 designates the body of the lens apparatus and the reference numeral 2 denotes a focusing lens for focusing an object image. The reference numeral 3 designates a focus unit for moving the focusing lens 2 in the direction of the optical axis thereof. The focus unit 3 includes a mechanism movable in parallelism to the optical axis.

The reference numeral 4 denotes a motor for driving the focus unit 3. The reference numeral 5 designates an encoder circuit for detecting the amount and velocity of rotation of the motor 4. The reference numeral 6 denotes a driver circuit for operating the motor 4.

The reference numeral 7 designates a correction lens movable in a direction perpendicular to the optical axis and effecting hand vibration correction, and the reference numeral 8 denotes a shift correction unit including a mechanism directly connected to the correction lens 7 and movable in said perpendicular direction. The reference numeral 9 designates coils for electromagnetically driving the shift correction unit 8, and a magnetized magnet (not shown) is mounted on the shift correction unit 8. A coil 9 and a magnet are also mounted at positions 90° out of phase with respect to the upper and lower coils 9, etc. The reference numeral 10 denotes a driver circuit for a heavy current for supplying a current to the coils 9.

The reference numeral 11 designates a vibration gyroscope for detecting a hand vibration state (the vibration of the apparatus body), and the reference numeral 12 denotes a position detection circuit for effecting the position detection of the shift correction unit 8. Hand vibration correction control is to control a current supplied to the coils 9 with the output values of the vibration gyroscope 11 and the position detection circuit 12 as a feedback system. The reference numeral 13 designates a switch for determining the execution and non-execution of the hand vibration correction control, and the switch 13 is changed over and set by a user's operation.

The reference numeral 14 denotes a lens microcomputer (control means) which performs all the control of the lens apparatus, and the control governed by this lens microcomputer 14 includes camera communication control, etc. besides the focus control and the hand vibration correction control. The lens microcomputer 14 has as its basic constructions a timer counter, PWM output, A/D conversion, serial transfer, etc.

The reference numeral 17 designates a camera body. The reference numeral 15 denotes a lens mount for connecting the camera body 17 and the lens body 1 together, and the reference numeral 19 designates a camera mount for connecting the lens body 1 and the camera body 17 together. The lens mount 15 and the camera mount 19 are connected together by the user performing the relative rotating operation. The reference numeral 16 denotes a lens communication unit having a plurality of contacts for effecting serial communication with the camera, and the reference numeral 18 designates a camera contact unit having a plurality of contacts for effecting serial communication with the lens microcomputer 14. These communication units 16 and 18 are electrically connected together by the lens mount 15 and the camera mount 19 being connected together.

The reference numeral 20 denotes a distance measuring unit including a line CCD for measuring the distance to an object and a focus optical system. The reference numeral 21 designates a camera micro-computer which governs all the control of the camera. There are many control systems for distance measurement control, communication control, etc. in the camera microcomputer 21, but they are not described herein. Also, in FIG. 1, solid lines mean electrical connection, and dotted lines mean mechanical connection. Arrows mean the directions of electrical inputs and outputs.

The camera microcomputer 21 tries communication with the lens microcomputer 14 through the camera communication unit when it detects that the lens body 1 has been mounted on the camera body 17. The lens microcomputer 14 confirms that the lens body 1 is normally connected, and communicates to the camera microcomputer 21 that the lens body is normally mounted. Next, the camera microcomputer 21 waits for instructions from the user. When the instructions to start auto focusing is given from the user, the distance measuring unit 20 is operated to measure the distance to the object. The camera microcomputer 21 transmits the amount of deviation of the focusing lens 2 to the lens microcomputer 14 through the camera communication unit 16 to move the focusing lens 2 to the measured distance to the object. The lens microcomputer 14 drives the motor 4 through the driver circuit 6 in accordance with the instructions of the camera microcomputer 21, and starts the driving of the focusing unit 3. With the rotation of the motor 4, the output from the encoder circuit 5 is inputted to the lens microcomputer 14, which thus derives the amount and velocity of rotation of the motor 4 and effects control through the driver circuit 11.

Discretely from auto focusing control, the lens microcomputer 14 always detects the state of the switch 13, and when the instructions for executing hand vibration correction are given by the switch 13, the output value of the vibration gyroscope 11 is calculated and the difference between the control target position of the shift correction unit 8 and the present position detected by the position detection circuit 12 is taken, and the movement of the shift correction unit 8 is controlled through the driver circuit 10. Thereby the correction lens 7 is moved in a direction orthogonal to the optical axis and the position of the optical axis is corrected and thus, the object looks stopped to the user.

Now, the auto focusing control is arbitrarily effected in conformity with the user's will, while on the other hand, the hand vibration correction control is continuedly effected irrespective of the user's will. That is, the auto focusing control is unsuitable for the control at a predetermined cycle because the velocity control and driving amount control by encoder detection are main. Therefore, it is considered to be best to incorporate it into the control routine of a main portion which always effects detection and control on a loop in conformity with the processing capability of the microcomputer. Other control effected by the main portion includes, for example, the detection of various switches, various operations, etc.

On the other hand, the hand vibration correction control needs to store an output of the vibration gyroscope 11 and an output of the position detection circuit 12 at a predetermined sampling period and to perform the control of the shift correction unit 8. For control above by lens microcomputer 14, it is considered to be best to interrupt to the main portion at a predetermined period by using a timer function and to perform the hand vibration correction control during the interruption processing.

In the present embodiment, when these two kinds of control are effected by a microcomputer (lens microcomputer 14), the processing burden is increased and the processing speed is reduced with a result that for example, to prevent such a situation that further hand vibration correction interruption is applied during the interruption processing of hand vibration correction control, the cycle for which hand vibration correction interruption (hereinafter referred to also as timer interruption) is applied is lengthened during the driving of the focus unit 3. Further, even during the driving of the focus unit 3, the control time is most required particularly during acceleration and deceleration and therefore, it is made possible to lengthen the cycle only during acceleration and deceleration control to thereby minimize the adverse effect upon hand vibration correction control.

Also, whether the hand vibration correction interruption processing is always superposed on the drive processing of the focus unit 3 depends on their control states. For example, when the movement velocity of the focus unit 3 is low, the interruption processing resulting from a change in the output of the encoder 5 decreases and therefore, the processing burden does not become so great and it is not necessary to change the interruption cycle of the hand vibration correction control. Also, in the hand vibration correction control, when the user is skilled in the photographing by camera and hand vibration does not occur very much, it is also considered that the output value of the vibration gyroscope 11 does not differ from that during the last interruption processing and this time, the driving of the shift correction unit 8 is not necessary, and again in this case, the processing burden does not become so great and therefore, it is not necessary to change the interruption cycle of the hand vibration correction control.

As a control method taking these into account, it is conceivable to detect the movement velocity of the focus unit 3 and the control states such as acceleration, constant velocity and deceleration, for example, during the hand vibration correction interruption processing, and decrease the frequency of timer interruption processing in conformity with the detected state.

Figure 2A:
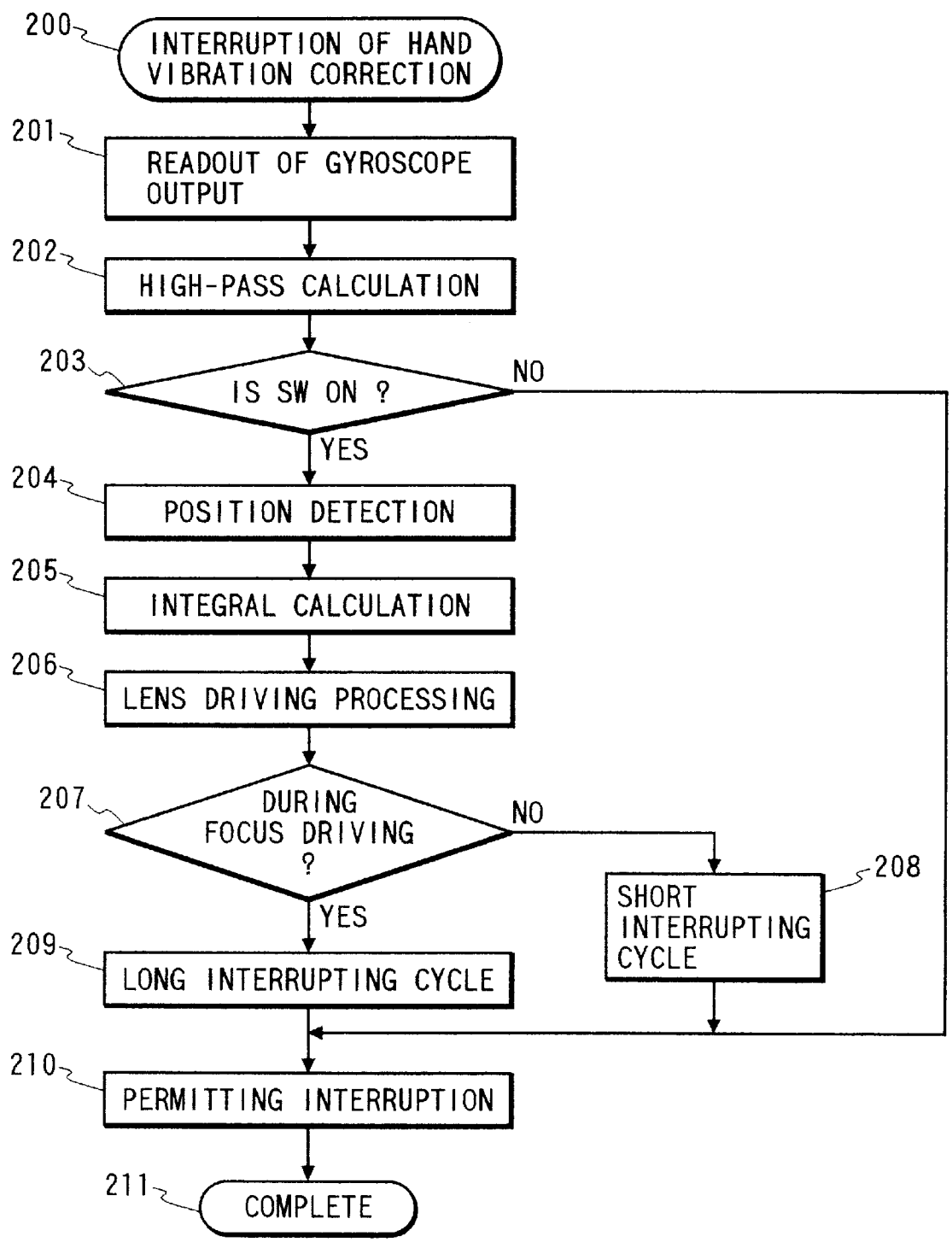
FIGS. 2A and 2B are flow charts for changing the execution cycle of hand vibration correction control executed by the microcomputer of the lens of FIG. 1.

FIG. 2A is a program flow chart for the hand vibration correction control effected by the lens microcomputer 14 in the present embodiment. As previously described, the hand vibration correction control is executed at a predetermined cycle by the use of the timer interruption to the microcomputer 14. The hand vibration correction control is an interruption processing routine and is therefore processed at an indefinite position on the loop routine of the main portion.

When at a step 200, timer interruption is applied, at a step 201, the output of the vibration gyroscope 11 is obtained through the A/D function of the lens microcomputer 14. In the present embodiment, timer interruption is set so as to be applied at each 500 μsec., and accordingly this routine is repetitively executed at each cycle of ½ KHz.

At a step 202, the A/D output value of the vibration gyroscope 11 is subjected to the filter by the program and the removal of an electrical DC component is effected, and the amplitude component by hand vibration is emphasized and is stored in an internal memory.

At a step 203, the state of the switch 13 is confirmed, and whether the hand vibration correction control should be effected is judged. If the switch 13 is OFF, hand vibration correction is not executed, but timer interruption is permitted, and the processing is completed. It is when the microcomputer used is of a specification for inhibiting multiplex interruption that the interruption is permitted here, and when multiplex interruption inhibition is not used, the permission for interruption becomes unnecessary.

At a step 204, the output of the position detection circuit 12 is obtained to detect the present position of the shift correction unit 8. In the present embodiment, description is made as PSD (position sensitive diode) being used as a position detecting method. The output of the position detection circuit 12 is introduced by the A/D function of the lens microcomputer 14, and is stored in a memory in the lens microcomputer 14.

At a step 205, the result calculated at the step 202 is read out of the memory and integral calculation is effected. Thereby an angular velocity signal which is the output value of the vibration gyroscope 11 is converted into an angular displacement signal. Subsequently, the position output of the shift correction unit 8 detected at the step 204 is read out of the memory, and the amount of movement of the shift correction unit 8 is calculated from the difference thereof from the angular displacement signal.

At a step 206, on the basis of the result calculated at the step 205, electric power is supplied to the coils 9 through the driver circuit 10 and the driving control of the shift correction unit 8 is effected.

At a step 207, whether the focus unit 3 is being moved is discriminated. If it is discriminated that the focus unit 3 is not being moved, advance is made to a step 208. In this case, the processing by the lens microcomputer 14 is quick and therefore, at the step 208, the process of shortening the cycle to the next timer interruption is carried out. This process, however, is carried out only when the sampling cycle till the last time is set long, and this process is not carried out when the sampling cycle till the last time is short. For example, when the present sampling cycle (timer interruption cycle) is as long as ¼ KHz (1000 μsec.), it is made into ½ KHz (500 μsec.) cycle, whereby it becomes possible to effect more minute and accurate hand vibration correction.

On the other hand, if at the step 207, it is discriminated that the focus unit 3 is being moved, advance is made to a step 209. If the focus unit 3 is being moved, the processing by the lens microcomputer 14 is slow and therefore, at the step 209, the process of lengthening the cycle till the next timer interruption is carried out. This process, however, is carried out only when the sampling cycle till the last time is set short, and the process is not carried out when the sampling cycle till the last time is long. For example, when the sampling cycle till the last time is as short as ½ KHz (500 μsec.), it is made into ¼ KHz (1000 μsec.) cycle, whereby it becomes possible to eliminate the hindrance to the movement control of the focus unit 3. At this step, the sampling cycle of hand vibration correction is set long, but this poses no problem to the usually used performance because man's hand vibration cycle is about ⅒ Hz to ¼ Hz.

After the interruption cycle has thus been changed, at a step 210, timer interruption is permitted and advance is made to a step 211, where the present hand vibration correction interruption is completed.

Here, the specification of the microcomputer can be divided broadly into three kinds, i.e., one for inhibiting all the other interruptions during the interrupting process, one for inhibiting only the interruption of the same control during the interrupting process, and one for not inhibiting all the other interruptions, but applying inhibition in a program as required. The former two include many kinds such as one in which the other interruptions automatically become inhibited at a point of time whereat the interrupting process has been applied, and the interruption becomes permitted simultaneously with the completion of the interrupting process, and one which is intactly held in an inhibited state unless the interruption is permitted in a program.

The present embodiment adopts a microcomputer specification of a type which inhibits only the same interrupting process when an interrupting process has entered, and permits the same interruption in a program upon completion of the processing. Therefore, the other interruptions are permitted during the hand vibration correction interrupting process and thus, if a number of interrupting processes (which will be described later and will hereinafter be referred to as the encoder interruption) conforming to a change in the output of the encoder circuit 5 resulting from the driving of the focus unit 3 are applied, hand vibration correction and focus control may be delayed.

In this point, when the movement velocity of the focus unit 3 is low, the encoder interruption decreases and the processing capability of the lens microcomputer 14 does not drop so much. Specifically, the case where the movement velocity of the focus unit 3 is low refers to a case where the capacity of a battery is deficient, or a case where due to the difference in the kind of apparatus, the weight of the lens to be moved is heavy or the load is great. In such case, it is not necessary to lengthen the hand vibration correction sampling cycle during focus control to mitigate the burden of the lens microcomputer 14.

Also, in auto focus control, there are nearly three kinds of velocity control areas, i.e., an acceleration area, a constant velocity area and a deceleration area. It is during the high velocity when the frequency of the encoder interrupting process becomes greatest that the processing burden of the lens microcomputer becomes great. However, if during constant velocity movement even if at high velocity, it is not necessary to effect minute velocity control and the supply of electric power to the motor 4 becomes stable. However, the acceleration area and the deceleration area include the shift from low velocity to high velocity and the shift from high velocity to low velocity and it is also necessary to finely control the supply of electric power to the motor 4 and therefore, the processing burden of the microcomputer 14 becomes very great. Moreover, it is necessary to accurately position the focus unit 3 at a stop position in the deceleration area and therefore, the delay of control in the deceleration area must be avoided as much as possible.

Figure 2B:
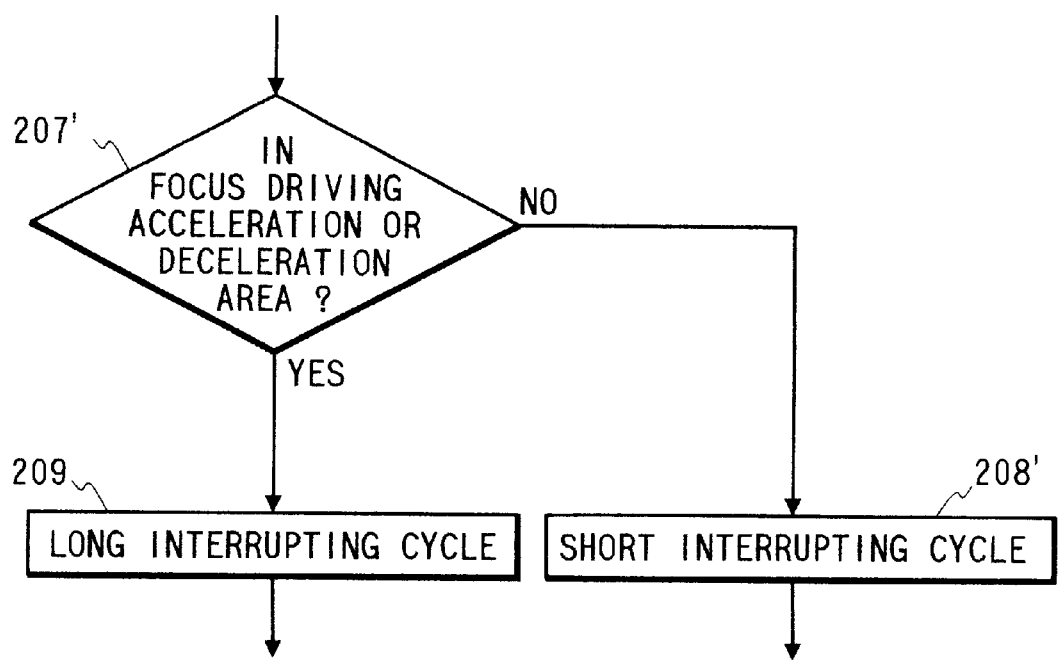

Therefore, if the step 207 in the above-described flow is regarded as the step of discriminating the present controlled state of the focus unit 3, as shown in FIG. 2B, the burden of the hand vibration correction control in the lens microcomputer 14 can also be made small. Specifically, design can be made such that at a step 207', whether the focus unit 3 is in the acceleration or deceleration area is discriminated and if it is in the acceleration or deceleration area, advance is made to a step 209, and if it is in the constant velocity area, advance is made to a step 208.

Second Embodiment

In the first embodiment, description has been made of a case where the sampling cycle of the timer interruption of the hand vibration correction control is changed depending on the controlled state of the focus unit 3 so that the hand vibration correction process may not be repetitively executed by the reduction in the processing speed by an increase in the processing burden of the lens microcomputer 14, but in this control, it is necessary to monitor the controlled state of the focus unit 3 at all times.

A program in which auto focus control and hand vibration correction control are linked together is liable to result in the complication of control, and to give birth to a mistake or misunderstanding, for example, when a plurality of persons made a program. So, in the present embodiment, description is made of a case where design is made such that control can be completed by only a hand vibration correction control program.

The program of the present embodiments executed in the lens apparatus described in the first embodiment. In the present embodiment, however, in order to make the program simpler, a lens microcomputer 14 of a specification for the inhibition of multiplex interruption is used to dare to duplicate the interruption, but is designed so as not to effect the control by a new interruption.

As a control method taking these into account, there can be adopted, for example, a method of cancelling a new interrupting process when a demand for the next hand vibration correction interrupting process is made during a hand vibration correction interrupting process (when the interrupting process is duplicated). That is, when the interrupting process is duplicated, the interrupting process demanded later is cancelled, whereby it is possible to thin the control process depending on each controlled state and better the efficiency.

Figure 3:
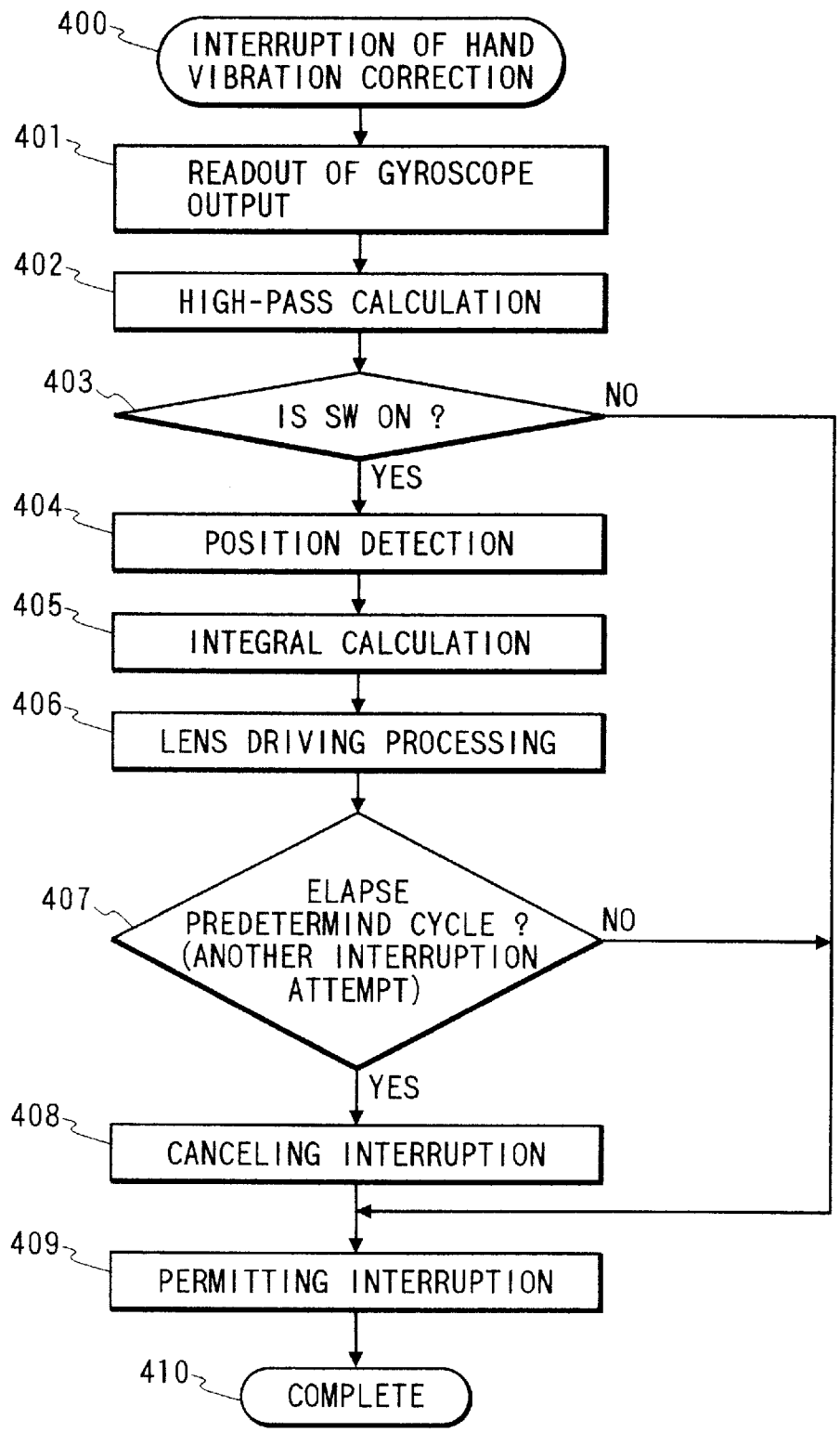
FIG. 3 is a flow chart for changing the execution cycle of hand vibration correction control executed by the microcomputer of a lens which is a second embodiment of the present invention.

FIG. 3 shows a program flow chart of that portion in the lens microcomputer 14 of the lens apparatus of the present embodiment which is effecting the hand vibration correction control. As in the first embodiment, the hand vibration correction control is executed at a constant cycle by the use of the timer interruption of the microcomputer 14, and because it is an interrupting process routine, it is processed at an indefinite position on the loop routine of the main portion.

When at a step 400, timer interruption is applied, at a step 401, the output of the vibration gyroscope 11 is obtained through the A/D function of the lens microcomputer 14. In the present embodiment, the timer interruption is set so as to be applied at each 500 μsec. and accordingly, this routine is repetitively executed at each cycle of ½ KHz.

At a step 402, the A/D output value of the vibration gyroscope 11 is passed through the filter by the program and an electrical DC component is removed thereby, and the amplitude component by hand vibration is emphasized and is stored in the internal memory.

At a step 403, the state of the switch 13 is confirmed, and whether hand vibration correction control should be effected is judged. If the switch 13 is OFF, hand vibration correction is not executed, and timer interruption is permitted and the processing is completed. It is when the microcomputer used is of a specification for inhibiting multiplex interruption that the interruption is permitted here, and if the microcomputer is not for use for the inhibition of multiplex interruption, the permission for interruption becomes unnecessary.

At a step 404, the output of the position detection circuit 12 is obtained to detect the present position of the shift correction unit 8. In the present embodiment, description will be made as PSD (position sensitive diode) being used as the position detecting method. The output of this position detection circuit 12 is introduced by the A/D function of the lens microcomputer 14 and is stored in the memory in the lens microcomputer 14.

At a step 405, the result calculated at the step 402 is read out of the memory and integral calculation is effected. Thereby, an angular velocity signal which is the output value of the vibration gyroscope 11 is converted into an angular displacement signal. Subsequently, the position output of the shift correction unit 8 detected at the step 404 is read out of the memory, and from the difference thereof from the angular displacement signal, the amount of movement of the shift correction unit 8 is calculated.

At a step 406, on the basis of the results calculated at the step 405, electric power is supplied to the coils 9 through the driver circuit 10 and the driving control of the shift correction unit 8 is effected.

At a step 407, the interrupting state of the internal timer in the lens microcomputer 14 is detected, and whether a new timer interruption is included therein is confirmed. This is a method using one of the functions of the microcomputer which effects the confirmation as to whether the internal memory regarding the interrupting process has changed and the contents thereof represent the state of the interruption. The contents of the memory include the interrupting process going on, the permission for interruption going on, a demand for interruption, etc., and when a demand for interruption is inputted to the lens microcomputer 14 and the interrupting process is entered, the interrupting process going on is automatically set in the memory, and the permission for interruption going on and the demand for interruption are reset. When the interrupting process is completed, the interrupting process going on is automatically reset.

At a step 408, if at the step 407, a demand for a new interruption is put out, only that portion of the memory which corresponds to the demand for interruption is forcibly reset and the new interruption is cancelled. By thus thinning the hand vibration correction control, the burden of the lens microcomputer 14 can be decreased to thereby eliminate the influence upon focus control. At this step, the new interruption during the interruption control of the hand vibration correction control may be cancelled with a result that the interruption cycle of the hand vibration correction control is lengthened, but man's hand vibration cycle is about ⅒ Hz to ¼ Hz and therefore, this poses no problem to the performance in the ordinary use.

Lastly, at a step 409, timer interruption is permitted, and at a step 410, the present hand vibration correction interruption is completed.

Third Embodiment

In the first and second embodiments, description has been made of a method of coping on the hand vibration correction control side, but in the present embodiment, description will be made of a method of coping on the auto focus control side. The present embodiment is also applied to the lens apparatus described in the first embodiment.

Figure 4:
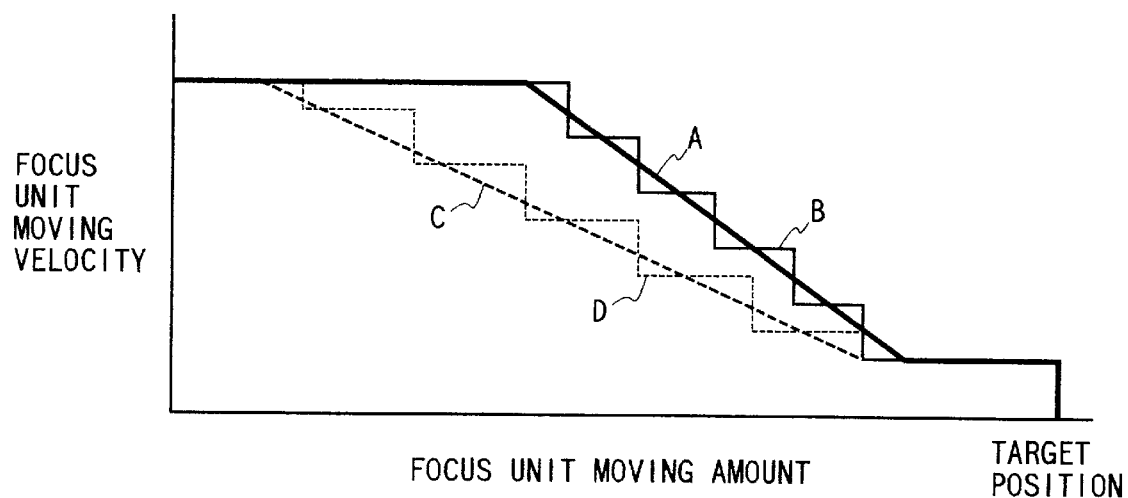
FIG. 4 is a graph showing the deceleration characteristic of focus control executed by the microcomputer of a lens which is a third embodiment of the present invention.

FIG. 4 shows the relation between the velocity and the moving amount (position) of the focus unit 3 by the focus control according to the present embodiment, and particularly the velocity control in a deceleration area, and the axis of ordinates represents the moving velocity of the focus unit 3 and the axis of abscissas represents the moving amount of the focus unit 3. Also, a solid line A is a preset target velocity control curve applied when the hand vibration correcting function is inhibited by the switch 13. Also, a solid line B is the actual velocity control curve of the focus unit 3 when the moving velocity of the focus unit 3 is controlled by the microcomputer 14 in order to adjust it to the target velocity curve A. A dotted line C is a preset target velocity control curve applied when the hand vibration correcting function is permitted by the switch 13, and a dotted line D in the actual velocity curve of the focus unit 3 when the moving velocity of the focus unit 3 is controlled by the microcomputer 14 in order to adjust it to the target velocity curve C.

When the hand vibration correction is not effected, the rate of the time taken for auto focus control in the lens microcomputer 14 is great and therefore, the moving velocity of the focus unit 3 is controllable in a form along the target velocity curve A. However, when the hand vibration correction control is effected, the rate of the time taken for auto focus control decreases and therefore, deceleration is not in time, but the focus unit 3 may sometimes stop beyond the target position. Such a phenomenon happens because the auto focus control is processed by the routine on the loop of the main portion described in the first embodiment.

To eliminate this, during the hand vibration correction control, auto focus control is done in a form along the target velocity curve C of FIG. 4, whereby the deceleration area can be secured long and the focus unit 3 can be smoothly stopped at the target position. The difference between the curve A and the curve C resides in the deceleration rate (inclination) and the deceleration starting timing, and the curve C is earlier in the deceleration starting timing than the curve A and is set smaller in the deceleration rate than the curve A.

Fourth Embodiment

Again in this embodiment, as in the third embodiment, description will be made of a method of coping on the auto focus control side. The present embodiment is also applied to the lens apparatus described in the first embodiment.

Figure 5:
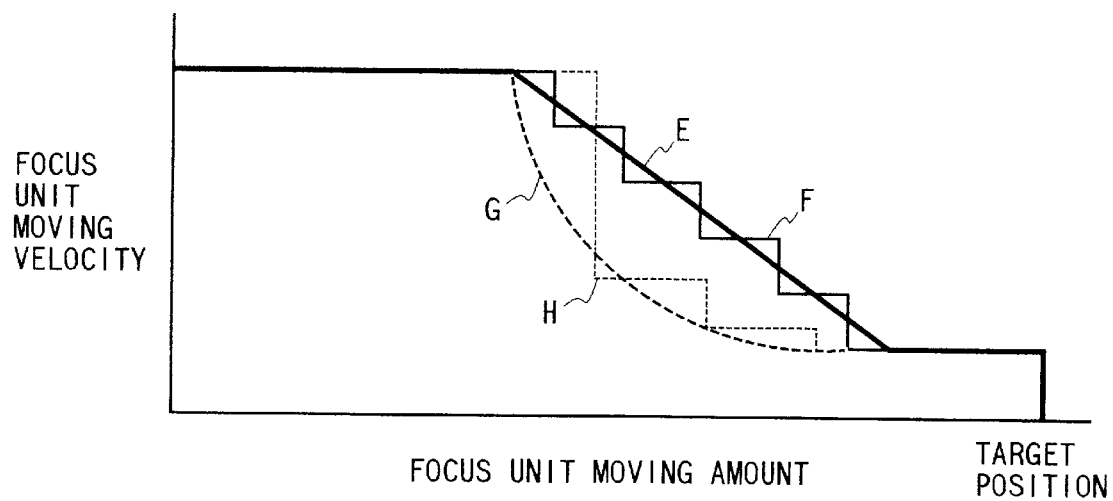
FIG. 5 is a graph showing the deceleration characteristic of focus control executed by the microcomputer of a lens which is a fourth embodiment of the present invention.

FIG. 5 shows the relation between the velocity and the moving amount (position) of the focus unit 3 by the focus control according to the present embodiment, and particularly the velocity control in a deceleration area, and the axis of ordinates represents the moving velocity of the focus unit 3, and the axis of abscissas represents the moving amount of the focus unit 3. Also, a solid line E is a preset target velocity control curve applied when the hand vibration correcting function is inhibited by the switch 13. Also, a solid line F is the actual velocity control curve of the focus unit 3 when the moving velocity of the focus unit 3 is controlled by the microcomputer 14 in order to adjust it to the target velocity curve E. A dotted line G is a preset target velocity control curve applied when the hand vibration correcting function is permitted by the switch 13, and a dotted line H is the actual velocity curve of the focus unit 3 when the moving velocity of the focus unit 3 is controlled by the microcomputer 14 in order to adjust it to the target velocity curve G.

When the hand vibration correction is not effected, the rate of the time taken for auto focus control in the lens microcomputer 14 is great and therefore, the moving velocity of the focus unit 3 is controllable in a form along the target velocity curve E. However, when the hand vibration correction control is effected, the rate of the time taken for auto focus control decreases and therefore, deceleration is not in time, but the focus unit 3 may sometimes stop beyond the target position. Such a phenomenon happens because the auto focus control is processed by the routine on the loop of the main portion described in the first embodiment.

To eliminate this, during the hand vibration correction control, auto focus control is done in a form along the target velocity curve G of FIG. 5, whereby the deceleration area is the same but at the early stage of the deceleration, deceleration is sufficiently done within a short time as compared with the case of the curve E and moreover, at the late stage of the deceleration, the deceleration rate is gradually made smaller and therefore, the focus unit can be smoothly stopped at the target position. That is, the curve E is a linear deceleration curve, whereas the curve G is a quadratic functional deceleration curve. If the curve G is used, the deceleration amount at one time at the early stage of the deceleration can be made great and therefore, stable control will become possible even if the frequency of the execution of the auto focus control of the lens microcomputer 14 decreases.

(Embodiments Common to the First to Fourth Embodiments)

Figure 6:
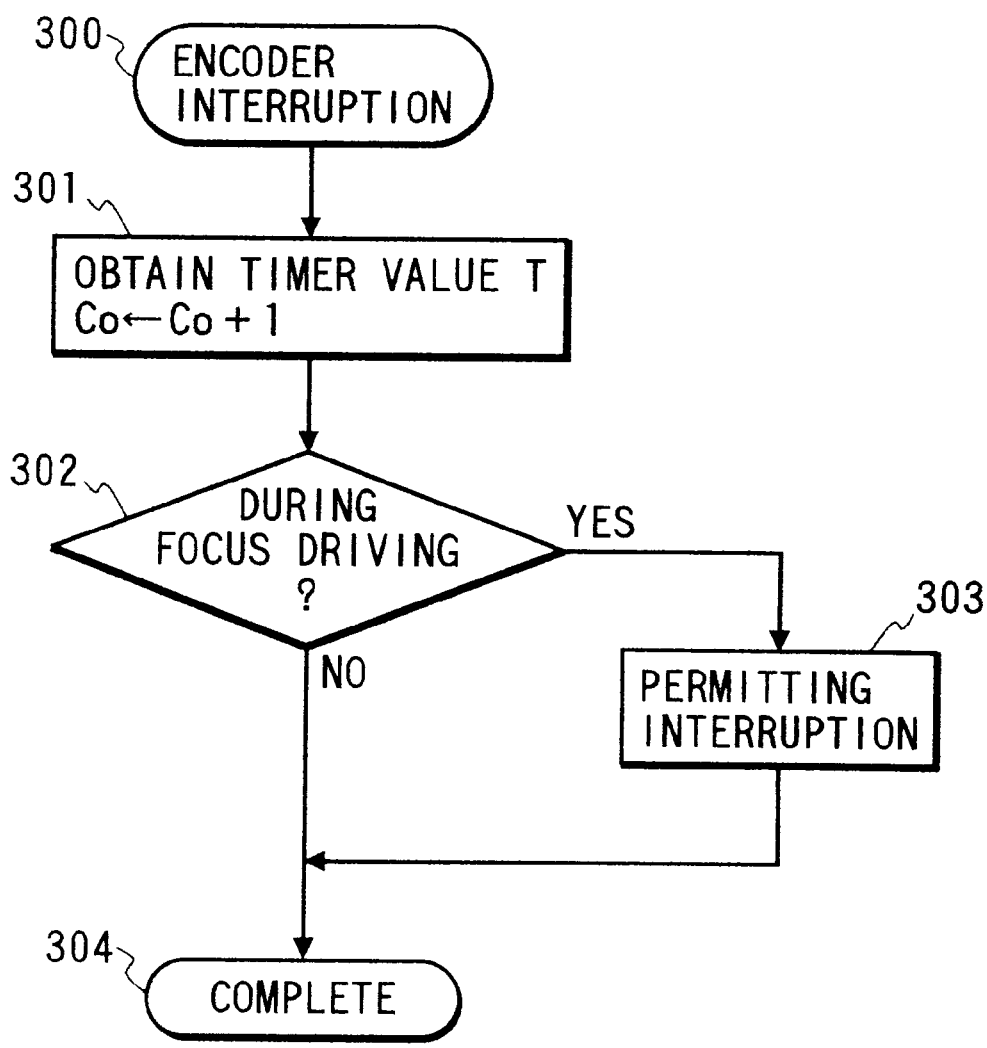
FIG. 6 is a flow chart of a focus control (encoder) interruption routine in the microcomputers of the lenses which are the first to fourth embodiments.

FIG. 6 shows a flow chart of an encoder interruption process program set so that when the focus unit 3 is moved by the motor 4, an interruption may enter in conformity with a change in the output of the encoder circuit 5 which detects the moving amount and moving velocity of the focus unit 3.

As the detecting system of the encoder circuit, there is supposed one comprised of a photointerrupter element and a disc formed with cut-aways at an equal pitch. When the focus unit 3 is moved, the disc rotates and the infrared light of the photointerrupter element is transmitted through the cut-away portion or is intercepted by the other portion than the cut-away portion, whereby a pulse-like waveform is outputted from the photointerrupter element and therefore, any change in this pulse output is read and an interruption is set so as to be applied to the lens microcomputer 14. The internal timer in the lens microcomputer 14 is set so as to start simultaneously with the starting of the focus movement.

When at a step 300, an encoder interruption enters, at a step 301, the lens microcomputer 14 reads the present value of the timer and causes it to be stored as T. The timer is once stopped, and is reset and restarted. Thereby, a time value corresponding to a change (a pulse) in the encoder circuit can be detected.

Also, at this step, a memory value C0 counting the frequency of encoder interruptions is increased by one count (C0←C0+1). Thereby the moving amount of the focus unit 3 can be detected.

Next, at a step 302, whether the focus unit 3 is moving is judged, and if it is moving, advance is made to a step 303, where the permission of an interrupting process is done, and then this interrupting process is completed, and if it is not moving, advance is made to a step 304, where the interrupting process is intactly completed. The step 303 copes with the specification of the microcomputer for the inhibition of multiplex interruption which means that interruption is inhibited simultaneously with the starting of the interrupting process.

Figure 7:
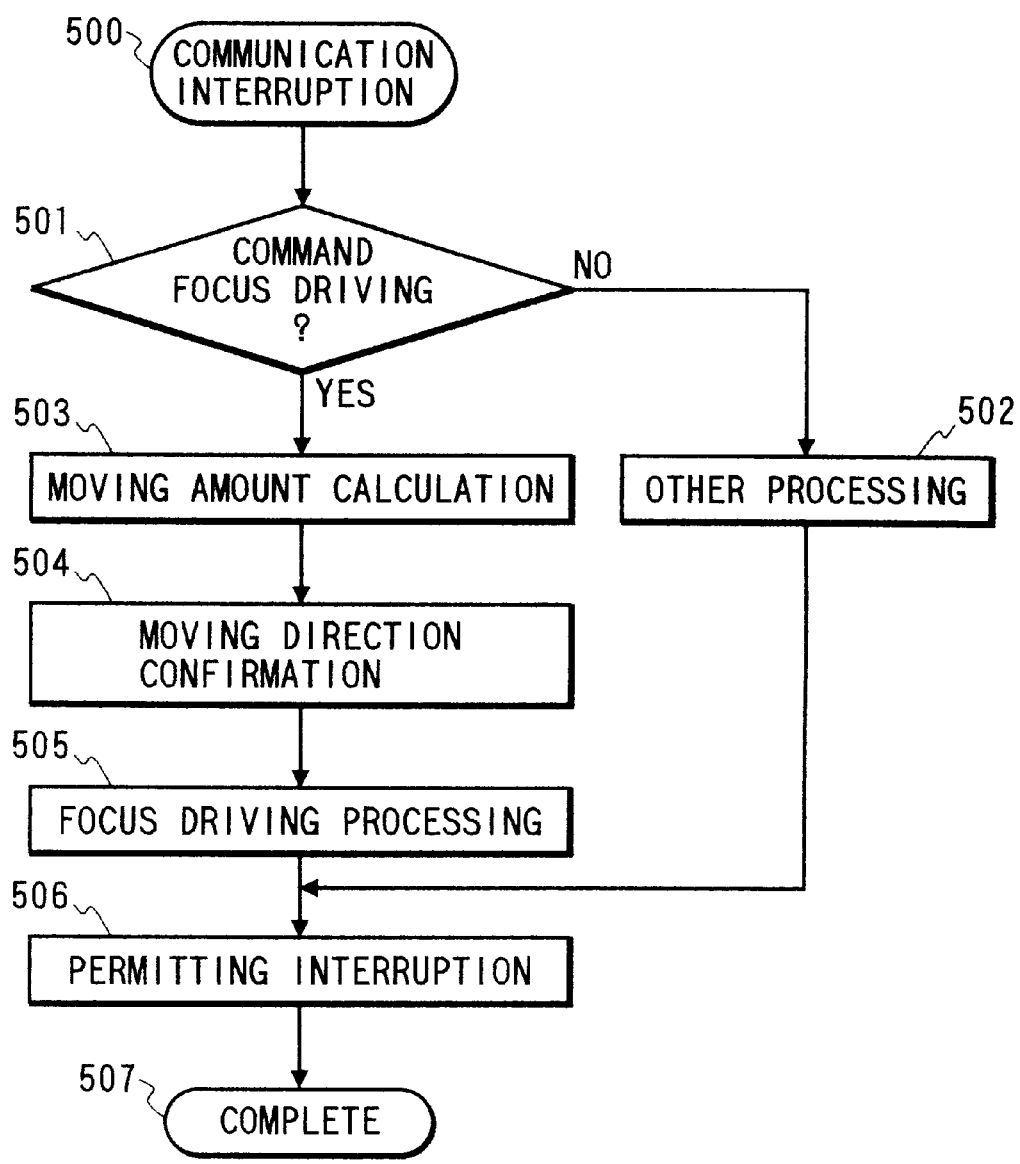
FIG. 7 is a flow chart of communication interruption in the microcomputers of the lenses which are the first to fourth embodiments.

FIG. 7 shows a program flow chart of a communication interruption process when a serial communication from the camera side has entered. The contents of the communication between the camera microcomputer 21 and the lens microcomputer 14 are chiefly the transmission and reception of data regarding optics, the confirmation of the states of body, a demand for the focus movement, etc., but here description will be made regarding the demand for the focus driving.

When at a step 500, a communication interruption from the camera enters, the lens microcomputer 14 advances to a step 501, where whether the content of the communication is a focus driving command or other process command is judged. If it is other process command, a corresponding process is carried out and at a step 506, the next communication interruption is permitted, and then this communication interruption process is completed.

When the content of the communication from the camera is the focus driving command, advance is made to a step 503. At this point of time, data corresponding to the moving amount of the focus is transmitted in advance from the camera microcomputer 21 by other communication and therefore, the moving amount of the focus is calculated from this data and the result of the calculation is stored in the internal memory M0.

Next, advance is made to a step 504. At this point of time, data corresponding to the direction of movement of the focus is transmitted in advance from the camera microcomputer 21 by other communication and therefore, the direction of movement of the focus unit 3 is derived from this data. At a step 505, in order to start the movement of the focus unit 3 in the derived direction of movement, the supply of electric power to the motor 4 is started through the driver circuit 6. At the same time, the internal timer for detecting the moving velocity of the focus unit 3 is reset, and then is started. Before the supply of electric power to the motor 4, the other memory in the lens microcomputer 14 regarding the focus control than the memory M0 is cleared.

The lens microcomputer 14 is of a specification for inhibiting multiplex interruption and therefore, at a step 506, it permits the next communication interruption, and then advances to a step 507, where it completes the current communication interruption process.

Figure 8B:
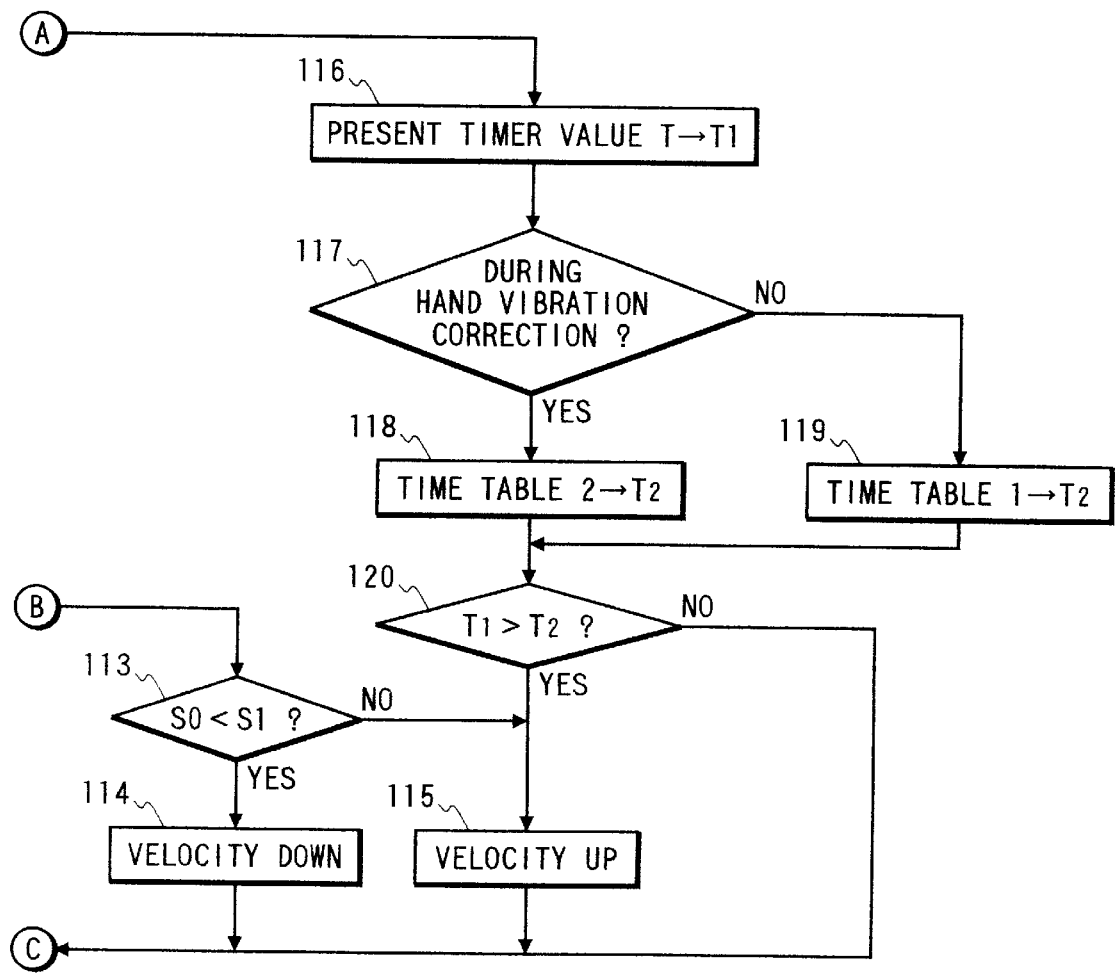
FIG. 8 is comprised of FIGS. 8A and 8B showing flow charts of a main portion in the microcomputers of the lenses which are the first to fourth embodiments.

FIGS. 8A and 8B show program flow charts of the main portion of the lens microcomputer 14. This main portion is in the form of loop-like control, and focus control is effected in this routine.

When the lens body 1 is mounted on the camera body 17 through the lens mount 15 and the camera mount 19, the lens communication unit 16 and the camera communication unit 18 are also electrically connected together through a contact. Thus, a power source is supplied from the camera 17 to the lens microcomputer 14, which thus starts the execution of the present program at a step 100, and performs the initializing operation for the internal memory (memory clearing, port setting, etc.) at a step 101.

Next, at a step 102, the states of various switches including the switch 13 are confirmed. Then, at a step 103, whether the driving control of the focus unit 3 by a focus driving command from the camera microcomputer 21 is being effected is discriminated, and if it is being effected, advance is made to a step 104, and if it is not being effected, return is made to the step 102.

At the step 104, whether there has been any change in the output of the encoder circuit 5 (whether the encoder interrupting process described with reference to FIG. 6 has been carried out) is discriminated, and if there has been a change in the output of the encoder, advance is made to a step 105. In this case, as described in connection with FIG. 6, the pulse interval time T and the moving amount C0 of the focus unit 3 have been changed and therefore, at the step 105, the actual moving amount C0 of the focus unit 3 is first subtracted from the moving amount M0 indicated from the camera, and the residual driving amount M is stored in the memory in the microcomputer.

Next, advance is made to a step 106, where whether the hand vibration correction control is going on at present is confirmed, and if the hand vibration correction control is going on, advance is made to a step 107, and if the hand vibration correction control is not going on, advance is made to a step 108.

At the step 107, in conformity with the residual driving amount calculated at the step 105, the value of a target velocity table 1 (the value on the curve C of FIG. 4 or the curve G of FIG. 5) stored in advance in the internal memory as the velocity data when the hand vibration correction control is going on is stored in an internal memory S0. In this case, the data need not be velocity data, but may simply be a time value per pulse.

On the other hand, at the step 108, in conformity with the residual driving amount calculated at the step 105, the value of a target velocity table 2 (the value on the curve A of FIG. 4 or the curve E of FIG. 5) stored in advance in the internal memory as the velocity data when the hand vibration correction control is not being effected is stored in the internal memory S0. The data in this case again need not be velocity data, but may be a time value per pulse.

After the target velocity data has been thus stored in the internal memory S0, advance is made to a step 109, where the moving velocity of the focus unit 3 is calculated from the actual pulse interval time T and is stored as the actual velocity S1 in the internal memory. In this case, the pulse interval time need not always be converted into velocity, but may be intactly stored as a time value. Particularly, when at the steps 107 and 108, the time value has been stored, the time value is also stored at the step 109, whereby a wasteful calculating process can be omitted.

Next, advance is made to a step 110, where the target velocity S0 determined at the step 107 or the step 108 and the actual velocity S1 found at the step 109 are compared with each other, and if the two are the same values, advance is made to a step 111, and if the two are different values, advance is made to a step 113.

At the step 111, whether the value of the residual driving amount M calculated at the step 105 is greater than 0 is discriminated, and if it is greater than 0, advance is made to a step 102, and if it is equal to or less than 0, advance is made to a step 112. At the step 112, the driving control of the focus unit 3 instructed from the camera microcomputer 21 has been completed and therefore, the control is stopped. The internal timer in the lens microcomputer 14 started at the step 505 in the aforedescribed flow of FIG. 7 is stopped, and the encoder interruption is inhibited and return is made to the step 102.

On the other hand, at the step 113, the target velocity S0 and the actual velocity S1 are compared with each other, and if the target velocity S0 is smaller (the moving velocity of the focus unit 3 at present is too high), advance is made to a step 114, where the supply of electric power to the motor 4 is decreased through the driver circuit 6 to thereby decelerate the moving velocity of the focus unit 3. As the method of supplying electric power to the motor 4, there is PWM control, voltage control, electric power control (when a vibration type motor is used) or the like. Also, if the target velocity S0 is greater (the moving velocity of the focus unit 3 at present is too low), advance is made to a step 115, where the supply of electric power to the motor 4 is increased through the driver circuit 6 to thereby accelerate the moving velocity of the focus unit 3. After the moving velocity of the focus unit 3 has been thus adjusted, advance is made to a step 111.

If at the step 104, there is no change in the output from the encoder circuit 5, velocity control cannot be effected and therefore, the time control from the internal timer is effected. That is, the value of the internal timer started at the step 505 in the flow of FIG. 7 is read, and from that value, the value T read at the step 301 in the flow of FIG. 6 is subtracted and the result of the subtraction is stored as T1 in the internal memory in the lens microcomputer 14. This T1 represents the cumulative time from the time when there was an encoder interruption or from the time when the focus control was started, and the greater is this value, the lower is the moving velocity of the focus unit 3.

Next, advance is made to a step 117, where whether the hand vibration correction control is going on at present is discriminated, and if the hand vibration correction control is going on, advance is made to a step 118, and if the hand vibration correction control is not going on, advance is made to a step 119. At the step 118, the value of a prescribed time table 1 stored in advance in the internal memory as the time data when the hand vibration correction control was going on is stored in an internal memory T2. Also, at the step 119, the value of a prescribed time table 2 stored in advance in the internal memory as the time data when the hand vibration correction control was not being effected is stored in the internal memory T2.

After the prescribed time data has been thus stored in the internal memory T2, advance is made to a step 120, where the values of T1 and T2 are compared with each other. If T1 is greater than T2, the moving velocity of the focus unit 3 is too low and therefore, advance is made to the step 115, where the moving velocity of the focus unit 3 is accelerated. On the other hand, if T1 is smaller than T2, the moving velocity of the focus unit 3 is too high and therefore, advance is made to the step 111, where the moving velocity of the focus unit 3 is decelerated.

As described above, the set velocity of auto focus control is changed in accordance with the state of the hand vibration correction control, whereby accurate auto focus control can be effected even if the processing capability of the microcomputer 14 falls.

In each of the above-described embodiments, description has been made with auto focus control mentioned as the other control than anti-vibration control, but the present invention can also be applied to a case where the other control than auto focus control is effected.

Also, while each of the above embodiments has been described with respect to a lens apparatus removably mountable on a camera, the present invention can also be applied to a camera integrally having a lens and other optical apparatuses.

The individual components shown in a schematic or block form in the drawings are all well-known in the camera art and their specific construction and operation are not critical to the operation or best mode for carrying out the invention.

While the present invention has been described with respect to what is presently considered to be the preferred embodiments, it is to be understood that the invention is not restricted to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An optical apparatus having an image blur correcting function comprising:

optical means for performing a focus adjustment;

image blur correction means for correcting an image blur;

control means for effecting first drive control for driving said image blur correction means to correct image blur and second drive control for moving the optical means for focus adjustment, and varying means for effecting 1) to make the manner of said first control differ between a case where said first control is effected in parallel with said second control and a case where said first control is effected without said second control being effected in parallel, or 2) to make the manner of said second control differ between a case where said second control is effected in parallel with said first control and a case where said second control is effected without said first control being effected in parallel.

2. An apparatus according to claim 1, wherein said varying means includes means for changing the control characteristic of the driving velocity of a focusing lens in said second drive control when said varying means executes said first drive control and said second drive control in parallel with each other.

3. An apparatus according to claim 2, wherein said varying means includes means for changing a deceleration characteristic of said focusing lens.

4. An apparatus according to claim 3, wherein said varying means includes means for changing deceleration starting timing of driving of said focus lens.

5. An apparatus according to claim 1, wherein the method of said first drive control detects the vibration of an apparatus body at a predetermined cycle and moves said image blur correction means and said varying means changes said predetermined cycle.

6. An apparatus according to claim 1, wherein said control means includes is a microcomputer.

7. An apparatus according to claim 6, wherein said microcomputer includes means for performing as the interruption processing in accordance with a timer.

8. An apparatus according to claim 3, wherein said control means includes means for effecting as said second drive control the control of carrying out a decelerating process from predetermined velocity in an area approximate to a driving target position in the driving area of a focusing lens and stopping the lens at the target position, and said varying means includes means for decelerating the characteristic of said decelerating process by a slow velocity change as compared with a case where said first drive control is not effected but said second drive control is effected, when said first drive control and said second drive control are executed in parallel with each other.

9. An apparatus according to claim 8, wherein said control means includes means for performing, the velocity control during said decelerating process as a velocity comparing process so that preset target velocity and focusing lens velocity become the same velocity, and means for executing said velocity comparing process at each cycle conforming to the driving velocity.

10. An apparatus according to claim 1, wherein said image blur correction means includes means for correcting the image blur optically.

11. An apparatus according to claim 10, wherein said image blur correction means includes means for moving the optical means so as to deflect a light beam.

12. An apparatus according to claim 11, wherein said image blur correction means includes means for operating the optical means in a direction perpendicular to the optical axis.

* * * * *

UNITED STATES PATENT AND TRADEMARK OFFICE
CERTIFICATE OF CORRECTION

PATENT NO. : 5,933,661

DATED : August 3, 1999

INVENTOR(S) : AKIHIRO KAWANAMI

It is certified that error appears in the above-identified patent and that said Letters Patent is hereby corrected as shown below:

COLUMN 4
Line 1, "continuedly" should read --continually--.

COLUMN 9
Line 17, "in" should read --is--.

COLUMN 11
Line 11, "other" should read --another--.

COLUMN 14
Line 5, "the" should read --said--;
Line 6, "adjustment," should read --adjustment;--;

UNITED STATES PATENT AND TRADEMARK OFFICE
CERTIFICATE OF CORRECTION

PATENT NO. : 5,933,661

DATED : August 3, 1999

INVENTOR(S) : AKIHIRO KAWANAMI

It is certified that error appears in the above-identified patent and that said Letters Patent is hereby corrected as shown below:

COLUMN 14
Line 8, "control" should read --drive control--;
Line 9, "control" (both occurrences) should read
   --drive control--;
Line 10, "control" should read --drive control--;
Line 11, "control" should read --drive control--;
Line 12, "control" should read --drive control--;
Line 13, "control" should read --drive control--;
Line 14, "control" should read --drive control--;
Line 15, "control" (both occurrences) should read
   --drive control--;
Line 28, "focus" should read --focusing--;
Line 35, "is" should be deleted.

UNITED STATES PATENT AND TRADEMARK OFFICE
CERTIFICATE OF CORRECTION

PATENT NO. : 5,933,661

DATED : August 3, 1999

INVENTOR(S) : AKIHIRO KAWANAMI

It is certified that error appears in the above-identified patent and that said Letters Patent is hereby corrected as shown below:

COLUMN 14
Line 37, "as the" should be deleted;
Line 42, "predetermined" should read --a predetermined--;
Line 51, "performing," should read --performing--;
Line 60, "the" should read --said--; and
Line 64, "the optical means" should read
   --said optical means--.

Signed and Sealed this

Thirty-first Day of October, 2000

Attest:

Q. TODD DICKINSON

*Attesting Officer*     *Director of Patents and Trademarks*